United States Patent
Wenger et al.

(10) Patent No.: US 9,058,749 B2
(45) Date of Patent: Jun. 16, 2015

(54) EMBEDDED SIMULATOR METHOD AND RELATED SYSTEM

(75) Inventors: Jason C. Wenger, Cedar Rapids, IA (US); Jaclyn A. Hoke, Marion, IA (US); Brian R. Wolford, Cedar Rapids, IA (US); Alex Postnikov, Cedar Rapids, IA (US); Thomas Schnell, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 288 days.

(21) Appl. No.: 13/608,271

(22) Filed: Sep. 10, 2012

(65) Prior Publication Data

US 2013/0323686 A1  Dec. 5, 2013

Related U.S. Application Data

(60) Provisional application No. 61/655,903, filed on Jun. 5, 2012, provisional application No. 61/655,917, filed on Jun. 5, 2012.

(51) Int. Cl.
*G09B 9/02* (2006.01)
*G09B 9/08* (2006.01)

(52) U.S. Cl.
CPC .................................. *G09B 9/08* (2013.01)

(58) Field of Classification Search
CPC ..... G09B 9/08; G01S 19/51; G01S 2013/466; G01S 19/14
USPC .............. 701/448, 519, 514, 523; 434/29, 32; 342/70
See application file for complete search history.

(56) References Cited

U.S. PATENT DOCUMENTS

| | | | |
|---|---|---|---|
| 6,449,558 B1 | 9/2002 | Small | |
| 7,098,913 B1 | 8/2006 | Etherington et al. | |
| 7,605,719 B1 | 10/2009 | Wenger et al. | |
| 8,751,103 B2 * | 6/2014 | Hukkeri | 701/36 |
| 2010/0283853 A1 * | 11/2010 | Acree | 348/144 |
| 2012/0053832 A1 | 3/2012 | Irish et al. | |

FOREIGN PATENT DOCUMENTS

WO  WO 2007030098 A1  3/2007

OTHER PUBLICATIONS

Petovello, GNSS Solutions, Dec. 5, 2010. [retrieved on Nov. 26, 2012]. Retrieved from the internet: <http://web.archive.org/web/20101205094107/http://insidegnss.com/auto/sepoct08-gnsssolutions.pdf> pp. 20-24.

* cited by examiner

*Primary Examiner* — Marthe Marc-Coleman
(74) *Attorney, Agent, or Firm* — Angel N. Gerdzhikov; Donna P. Suchy; Daniel M. Barbieri

(57) ABSTRACT

A system and method is disclosed for correlation of received objects offering a valid presentation to an operator. The method correlates actual objects and simulated objects to offer a valuable training presentation environment to an operator. The method may receive a plurality of data streams including sensed data, simulated sensed data, and truth data to correlate among the plurality of data to determine if the data corresponds to a common object. Each of these data streams may be received from an off-board source via datalink or generated by an onboard simulation data source. The system correlates data received from an onboard source with data received from an off-board source to present the best available training scenario to the operator.

20 Claims, 13 Drawing Sheets

EMBEDDED SIMULATOR METHOD AND RELATED SYSTEM

RELATED APPLICATIONS

The present application claims the benefit of U.S. Provisional Application No. 61/655,903 filed on 5 Jun., 2012 entitled "EMBEDDED SIMULATOR METHOD AND RELATED SYSTEM" and U.S. Provisional Application No. 61/655,917 filed on 5 Jun., 2012 entitled "TRAINING DATA MANAGEMENT METHOD AND RELATED SYSTEM", and the present application is related to U.S. patent application Ser. No. 13/608,367 entitled "TRAINING DATA MANAGEMENT METHOD AND RELATED SYSTEM", filed on 10 Sep. 2012, all of which are hereby incorporated by reference in their entirety.

FIELD OF THE INVENTION

The present invention relates generally to simulation of situations for training purposes. More particularly, embodiments of the present invention relate to a computerized method and system for correlating embedded simulated information with actual information to enhance a training scenario.

BACKGROUND OF THE INVENTION

Training may be the basis upon which desired performance may depend. Enhancement of a training scenario may be a constant and desired goal of a training entity. A trainee may perform better in a future encounter with a scenario if the trainee has had previous experience with a similar scenario. Creation of a particular scenario may be difficult and expensive to create. For example, in training a Captain of a ship, the trainee/Captain may benefit from experience with a scenario involving a second ship from which the trainee/Captain must maneuver to avoid. To create a scenario involving two ships on a collision course may be prohibitively expensive as well as unsafe for the training entity charged with education of the trainee/Captain.

Many platforms may communicate information to an operator via a data display or other visual or aural indicator. For example, the Captain of the ship may reference a radar display from which he may determine a possible course of action to take to avoid a collision. Each user interface may communicate with the user in a specific way offering data to the user beneficial to operation of the platform. The Captain may visually reference a radar display, the Captain may aurally perceive a collision warning, and the Captain may visually perceive a flashing beacon on the horizon. All of these queues may provide an input to the decision the Captain may make.

Live training scenarios may provide the best possible training environment for a trainee. A trainee who has experienced an event in a real world training environment may subsequently perform more productively than if the trainee had not experienced the training event. Actual presence in the aircraft, flying through airspace, may add an increased aspect of positive stress to the training environment. For example, a wingman may practice a maneuver to position his aircraft for weapons employment as the flight lead aircraft makes a visual identification of a target. Having performed this maneuver numerous times in an actual fighter aircraft, the wingman may perform more productively in a combat scenario than if the wingman had not previously practiced the maneuver.

Live training scenarios using actual assets may have become increasingly expensive. The cost of one flight hour of an F/A-18E Super Hornet has risen dramatically in past years.

Simulation has found success in a variety of training scenarios. The cost of simulating a scenario may be a fraction of the cost of actually creating the same Live training scenario. Quality of simulation has been enhanced recently with computer generated graphics, computer generated threats, and integrated simulations.

Simulation of information communicated to an operator may be presented to the operator via the various indicators. For example, the training entity may present the ship's Captain a simulation of a radar display on which the Captain may base a decision. This simulation may be accomplished without the use of an actual ship. Radar displays, communications heard by the trainee, threats posed to the trainee, and consequences for each action taken by the trainee may all be generated by a computer device.

A variety of prior art methods of hybrid simulation have been used to effectively integrate a Virtual entity into a Live training scenario. One example of this integration includes Live Virtual Constructive (LVC) training that has evolved to enable multi-platform integration in a training scenario. LVC may include Live assets (such as an actual aircraft flying on a weapons range), Virtual assets (such as a pilot operating a simulator at a ground-based location), and Constructive assets (those objects generated and operated by an algorithm on a computer device).

Connectivity to ensure effective presentation to an operator may pose a challenge to successful integrated LVC simulation. In order for the operator to reference a presentation, the operator must have the presentation available to him. On an aircraft, this means an effective datalink capable of transmission of data to not only a single aircraft, but to an entire large force exercise of fighter and adversary aircraft, tanker and remote sensing aircraft, ground stations, and space based assets.

A datalink capable of multi-platform and multi mission connectivity may include such factors as Quality of service (QOS), number of participants, bandwidth allocation per participant, available spectrum, and usefulness in consideration of the rules of the geographic area in which an entity may operate.

Current Datalink Protocols may be ineffective when applied to such a connectivity requirement. Prior art protocols may offer fixed sized messages, with no guarantee of message delivery. Others may offer no guarantee of delivery in the order sent, or a fixed number of slots allocated to each communicator. Some may offer package delivery in a specific order but this order guarantee may limit speed of delivery. Other protocols may offer variable size payloads with variable bandwidth requirements. These protocols may sacrifice one characteristic to perform more effectively within a second characteristic. For example, a datalink protocol may guarantee delivery of a size limited message. Most protocols maintain a limited connectivity considering all desired characteristics of the datalink. However, when communication may be a requirement for safe and effective operation, these protocols may fall short of the desired requirement.

Correlation of objects received from more than one source may add value to performance of an operator acting in reliance on the objects. A human interface display filled with uncorrelated objects may confuse a trainee/operator and distract from an otherwise valuable and expensive training scenario.

Training situations may require accurate presentations to an operator to retain training value. In some sessions, training data may be displayed alongside actual data. Uncorrelated simulated data presented alongside actual data may create an unintentional presentation. Correlation of the training data and the actual data to create a presentation as intended by a training entity may add value to the training environment.

Simulation may be one valuable tool usable by an instructor to cost effectively train a student. However, simulation data displacing actual critical data may diminish student situational awareness and lead to diminishing levels of safety. An operator confused about which data may be simulated and which data corresponds to actual events may adversely affect the level of safety of the operator and those in proximity with the operator.

Prior correlation functions may receive sensed data from a first onboard sensor and correlate with sensed data received from a similar onboard sensor on a second platform. The two platforms may correlate like data to agree on a correlated object based on various parameters e.g., proximity, altitude, speed, and location accuracy.

Prior correlation functions may lack an ability to properly correlate unlike data. For example, a radar sensor on an aircraft may provide sensed data while a simulator may provide simulated sensed data. This unlike data may provide a challenge to current correlation algorithms.

Therefore, a novel approach may provide an embedded simulator within an actual presentation available to an operator. The embedded simulation may correlate unlike data received from various sources offering an operator a clear picture of the intended presentation. This novel approach may correlate actual objects and simulated objects to offer a valuable training environment. The novel approach may further correlate data received from an onboard source with data received from an off-board source to present the best available training scenario.

SUMMARY OF THE INVENTION

Accordingly, an embodiment of the present invention is directed to A method for correlating an object position, comprising: receiving a sensed data signal from an onboard object sensor, the sensed data signal indicating a sensed position of a first object, receiving a truth data signal via a datalink, the truth data signal based on an actual position of a second object, receiving a simulated sensed data signal via the datalink, the simulated sensed data signal based on the truth data signal, the simulated sensed data signal a simulated position of the second object, determining whether the sensed position of the first object, the actual position of the second object, and the simulated position of said second object correspond to a common object, correlating the sensed data signal, the truth data signal, and the simulated sensed data signal to determine at least one object position, and providing a notification of the at least one object position An additional embodiment of the present invention is directed to a method for correlating an object position comprising: receiving a first position signal from an onboard object position sensor, the first signal based on a sensed position of an object, receiving a second position signal generated by the object, the second signal indicating an actual position of the object, receiving a third position signal from an object position simulation, the third signal including a virtual object position, determining whether the sensed position, the actual position, and the virtual object position correspond to a common object position, correlating the first position signal, the second position signal, and the third position signal to determine at least one object position, and providing a notification of the at least one object position A further embodiment of the present invention is directed to A system for selective presentation of data, the system comprising: at least one onboard information communication device, a mission computer (MC) operatively coupled to the at least one onboard information communication device, the mission computer having non-transitory computer readable code embodied therein for carrying out the steps of: receiving off-board data from an external source, receiving onboard data from an internal source, determining at least one level of criticality of the off-board data and the onboard data, presenting the onboard data and the off-board data based on the at least one level of criticality.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

As used herein, embodiments of the present invention may relate to aircraft training in an airborne scenario. It is contemplated an aircraft may be one of many platforms on which the systems and methods described herein may be configured to operate. The current disclosure may be tailored to operate on any moving or stationary platform or object presentation device for which simulation may be desired. Criticality of data may provide a simulator instructor with needed tools for training. Hierarchy of data may allow a simulator to selectively display data for a productive simulation experience.

The disclosed invention may consist of at least two integrated parts. A first part discloses an embedded simulator configured for connecting a Live platform to a distributed exercise in a manner functionally indistinguishable from a traditional Virtual simulator participant, and a second part discloses an integrated correlation function allowing the embedded simulator to properly correlate received objects and present a valuable training scenario to a trainee.

Embedded Simulator

Figure 1A:
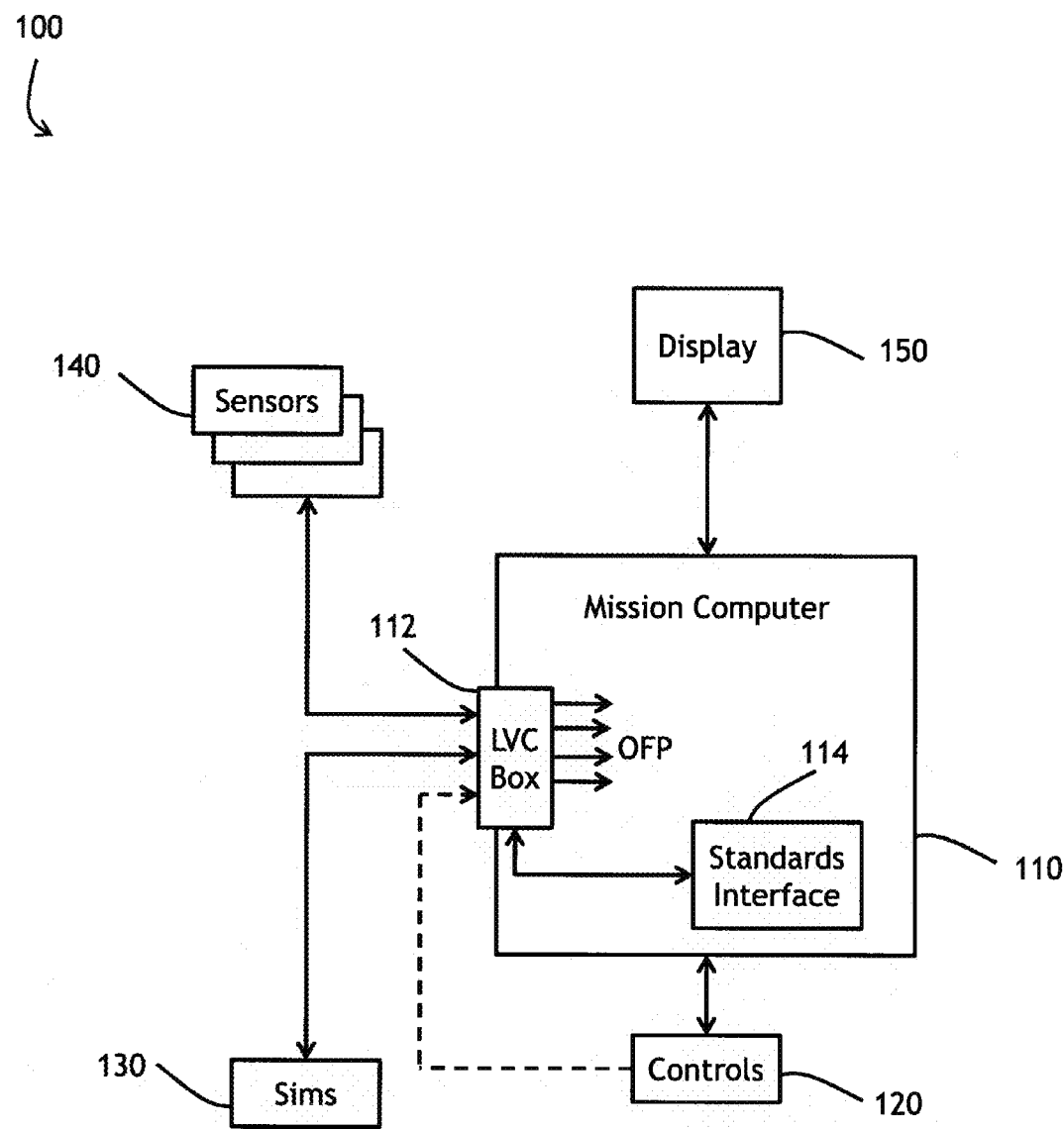
FIG. 1A is a diagram of an overview of an embedded simulator in accordance with a preferred embodiment of the present invention.

Referring to FIG. 1A, a diagram of an overview of an embedded simulator in accordance with a preferred embodiment of the present invention is shown. A preferred embodiment of the present invention may provide a system 100 for selective presentation of data to an operator. System 100 may provide simulation data embedded alongside actual data displayed to an operator. Preferably, the system 100 may be partitioned (either physically partitioned or partitioned as a software partition) comprising simulated data able to be separated or eliminated from an actual data display on a Live (L) platform when conditions warrant.

As used herein, simulated is defined as an object representative of an actual object. Simulated objects may be further broken in to two types based on how the simulated object is generated: Virtual (V) objects are simulations generated by a human interfacing with a machine while Constructive (C) objects are simulations generated solely by a machine. The system 100 may interface with an Operational Flight Program (OFP) running on a mission computer 110 of a platform 210 through an LVC interface 112 and a single, standards based interface 114. The standards based interface 114 may be configured for interpretation and transmission of well-known display standards such as an ARINC 610B and an ARINC 661 display standard. One embodiment of the present invention may include a standards based "hook" to perform such interpretation and transmission. As used herein, a hook may be defined as a unit of software configurable to augment the behavior of an operating system by periodically intercepting and altering the data available to the operating system.

Architecture Philosophy

One architectural implementation of the current invention may provide at least three levels of operation: a Training Mode, a First Fallback Mode, and a Final Fallback Mode. In the Training Mode, full functionality may be available to the operator. The operator may fully interact with Live (L) objects, Virtual (V) objects, and Constructive (C) objects to become immersed within the training scenario. The first fallback mode may revert to a standby format on the displays derived from a certified baseline. In the first fallback mode, no simulated (V or C) data may be presented to the operator. The display 150 may be limited to Live (L) objects only. The final fallback mode may revert to standby instruments either physically separated from the displays within the platform or a standby display integrated within a partition of the display 150.

The present invention may maintain several design goals:
a. Capture of insidious degradation during a failure
b. Safe Virtualization on a Live platform
c. Overcome datalink protocol challenges between dissimilar LVC assets
d. Minimal (preferably zero) modification to an existing OFP
e. Maintenance of federated architecture Operational safety concerns present a goal to separate the level of criticality of the training functions from critical functions needed for basic operation. For example, basic airmanship and navigational safety of a pilot and wingmen may be a more critical function and require constant attention whereas training of the wingmen may be of a less critical and thus, a secondary concern.

One goal of the present invention may be to ensure that failures of integrated training functions do not interfere with flight critical symbology. To this end, the disclosed invention may employ a partitioned architecture.

A Multi-Function Display (MFD) 150, mounted in portrait orientation, may optimally be used as a baseline display to an operator. It is contemplated two or more MFDs preferably mounted side by side may provide an optimal viewing area for an operator. MFD 150 may be a standard production unit for a flight deck of an aircraft. Each MFD 150 may run a tailored OFP with minimal modification from an existing certified flight deck.

The OFP application may include a processing block that may communicate with aircraft data sources and perform source selection and filtering for a minimal baseline set of parameters regarded critical. Such a critical baseline set of parameters may include: aircraft attitude, airspeed, altitude, heading, position, and the like. A certified primary flight display format may allow a cost effective implementation of the present invention. In the both of the Fallback Modes, system 100 partitioning may ensure that no training function symbology is permitted to be rendered anywhere on the MFD 150.

LVC interface 112 may provide an interface between the various inputs and the standards-based interface 114 into the OFP. Inputs to the LVC interface 112 may include sensors 140, simulators 130, and pilot controls 120. Traditionally, Pilot controls 120 may have provided input directly to the MC 110 for direct control of applications. Preferably, pilot control 120 inputs to system 100 software applications may be routed through LVC interface 112 and used as one input to the system 100 OFP applications. It is contemplated, should the pilot desire to discontinue system 100 applications and discontinue use of system 100 embedded simulator while in any of the three modes, the pilot may override the routing of pilot control 120 input and revert to direct access to MC 110 and OFP applications within.

Onboard Sensors 140 may provide input to the MC 110 through the LVC interface 112. As used herein, sensors may include all sensing devices able to provide input required for operational effectiveness. For example, in an aircraft environment, sensors 140 may include air data sensors, radio frequency (RF) sensors such as an active radar or radio altimeter, infrared (IR) sensors such as a passive IR detector. Critical data may be one input required for operational safety. Flight critical data may be provided by a plurality of air data sensors such as a well-known Air Data Attitude Heading Reference System (ADAHRS). Such exemplary ADAHRS may produce an RS-422 serial data stream configurable for input to the MC 110 as well as for display on MFD 150.

Simulators 130 may provide the Virtual (V) input and Constructive (C) input to the LVC interface 112. Simulators receiving input from a human operator of the simulator may provide the Virtual input while a machine operating in the environment may provide the Constructive input. For example, in a large force exercise with multiple LVC participants, an actual aircraft may be flying on a military range providing a Live input to the LVC, a pilot may operate a connected simulator providing the Virtual input to the LVC interface 112, and a connected computer may generate a Constructive input to the LVC interface 112.

This single, open, and standards-based interface 114 into the OFP on the MC 110 may allow a flexible, low cost path to integrating a training function as compared to a traditional tightly-coupled OFP integration. The partitioning inherent in the system 100 may allow the training application to be developed to standards consistent with the lower criticality of the training function. For example, a scenario involving operational pilot training may include multiple simulated (V and C) airborne and ground-based threats. However, actual threats of a higher level of criticality may be inherent to an operational flying mission. A failure of an engine, a collision course with an actual aircraft, and an actual adversary encroaching on an Air Defense Identification Zone (ADIZ) boundary may all be examples of levels of criticality higher than a training level of criticality. The partition function may inhibit lower criticality training information from displacing higher criticality operational information.

System Function Allocation

Figure 1B:
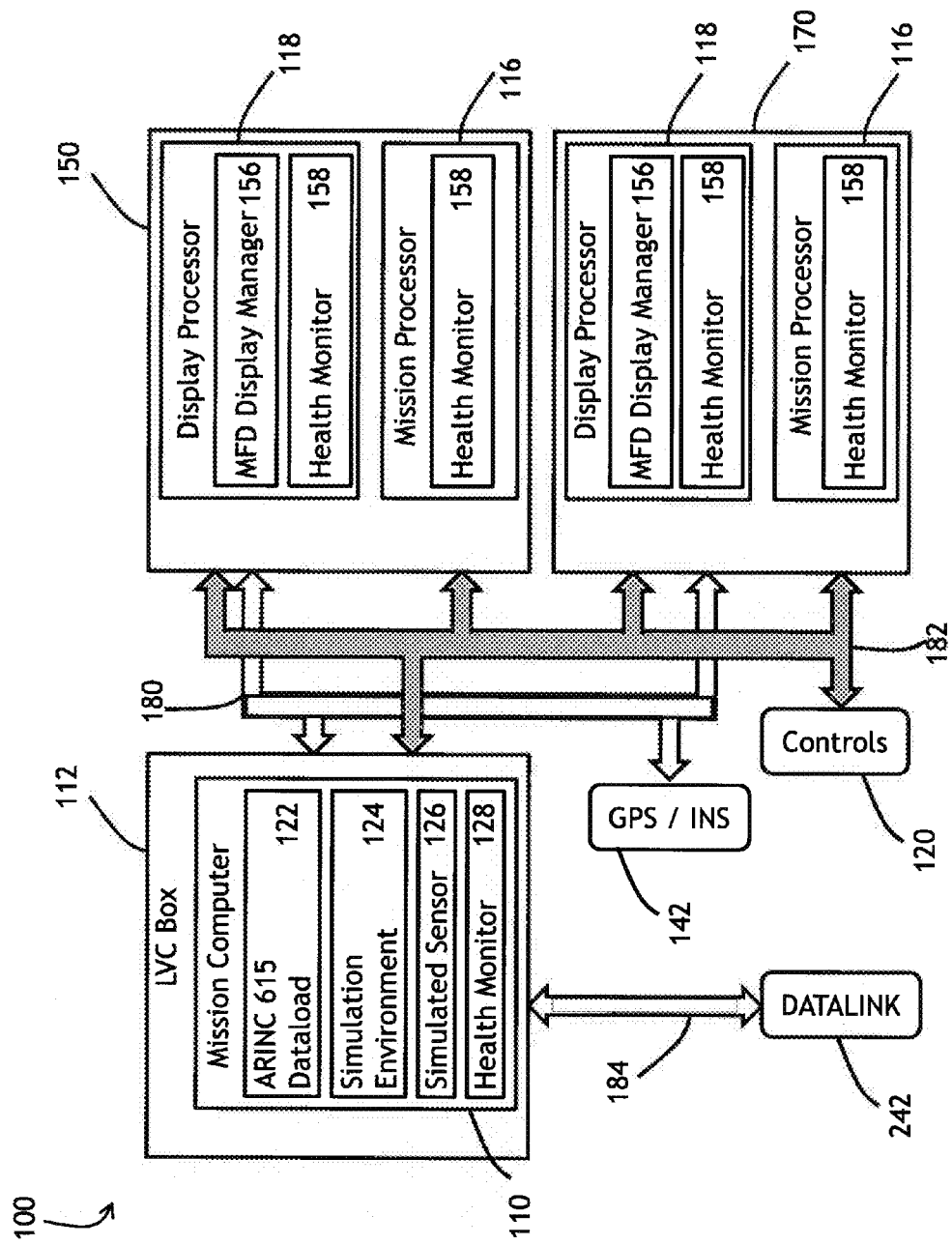
FIG. 1B a diagram of system function allocation of an embedded simulator in accordance with a preferred embodiment of the present invention.

Referring to FIG. 1B, a diagram of system function allocation of an embedded simulator in accordance with a preferred embodiment of the present invention is shown. Preferably three major computing and display devices may provide the computing resources necessary for implementation of system 100. As depicted, dual display MFD 150 170 may provide a display surface and a high assurance data path for critical flight data, while a mission computer (MC) 110 and LVC interface 112 may provide training functions. The processing required to perform training functions of the present invention may be hosted on a processor installed within the MC/DTU such as a 7448 processor card.

Within the MC 110, system 100 may provide an ARINC 615 dataload 122, a simulation environment 124, a simulated sensor 126, and a health monitor 128. Within each MFD 150 170, a mission processor 116 and a display processor 118 may provide computing resources for proper display of system 100 data to an operator. Within each mission processor 116 and display processor 118, a health monitor 158 may provide continuous health analysis of the monitored systems.

All interactions between the MFD 150 170 and the training application hosted on the MC 110 may be arbitrated by an ARINC Graphics Server (AGS) application operating on each MFD 150 170. The AGS application may be responsible to ensure partitioned access to the MFD 150 170 surface. Layer and window management within the AGS application and its configuration files may provide the rules to ensure that system 100 may properly partition the training function from critical symbology, that the training application may be allowed to present displays to the operator when conditions are proper, and more importantly to ensure that training symbology can never corrupt or obscure symbology of a higher level of criticality.

Within an aircraft flight deck, an auto driver's seat, bridge of a ship, etc., communications among each of the MFDs 150 170 and the mission computer 110 may be carried on a Dual system Ethernet network 180 and 182. As this Ethernet network may carry only the remainder of the training data that is not critical for flight, it may be permitted to contain a mix of hardened Avionics Ethernet and Commercial-Off-The-Shelf (COTS) devices.

Interaction with the system 100 may preferably be executed by an operator through hard or soft keys associated with each MFD 150 170. Operator control inputs may be provided in two ways. Each MFD 150 may preferably be surrounded on all four edges by a total of 30 line keys. Of these keys, 21 may preferably be available for use with the active training format. Additionally, control inputs 120 via a control stick and throttle for inputs may be preferably employed by the system 100. Hands on Throttle and Stick (HOTAS) inputs from flight controls may connect to system 100 via one side of the Dual system Ethernet 182. A well-known interface board may configure the HOTAS output 120 for LVC interface 112 input and provide a switch state via the Ethernet network.

Preferably, to further the goal of partitioned training data, a dedicated training datalink may be connected via a second Ethernet interface 184 on the MC/DTU 110. As datalink requirements may often vary depending on the training scenario and site, the present invention is configured for datalink agility. It is contemplated the present invention may integrate multiple types of datalink systems, operating on diverse radios, alternative waveforms and bandwidths, and within multiple frequency bands, with link capabilities varying from full TCP/IP connectivity to narrowband, time-slice allocated, fixed-sized packets. These various types of datalink may be integrated through a plurality of installation systems. A first installation system may include Ethernet and power connections brought to an access cover location on a platform 210, allowing for installation of various datalink required hardware and associated antenna requirements, each system may be preferably pre-mounted on one of a set of interchangeable cover plates allowing for ease of change to an additional requirement. Alternatively, a connectivity node for a datalink may be incorporated into a well-known external pod configured for attachment to an existing weapons station. One attachment method may include a set of engineered launcher rail adaptors fitted for either single or paired training pods conforming to the AIM-9 form factor on an aircraft's original wing pylons.

Deployment Considerations

Figure 1C:
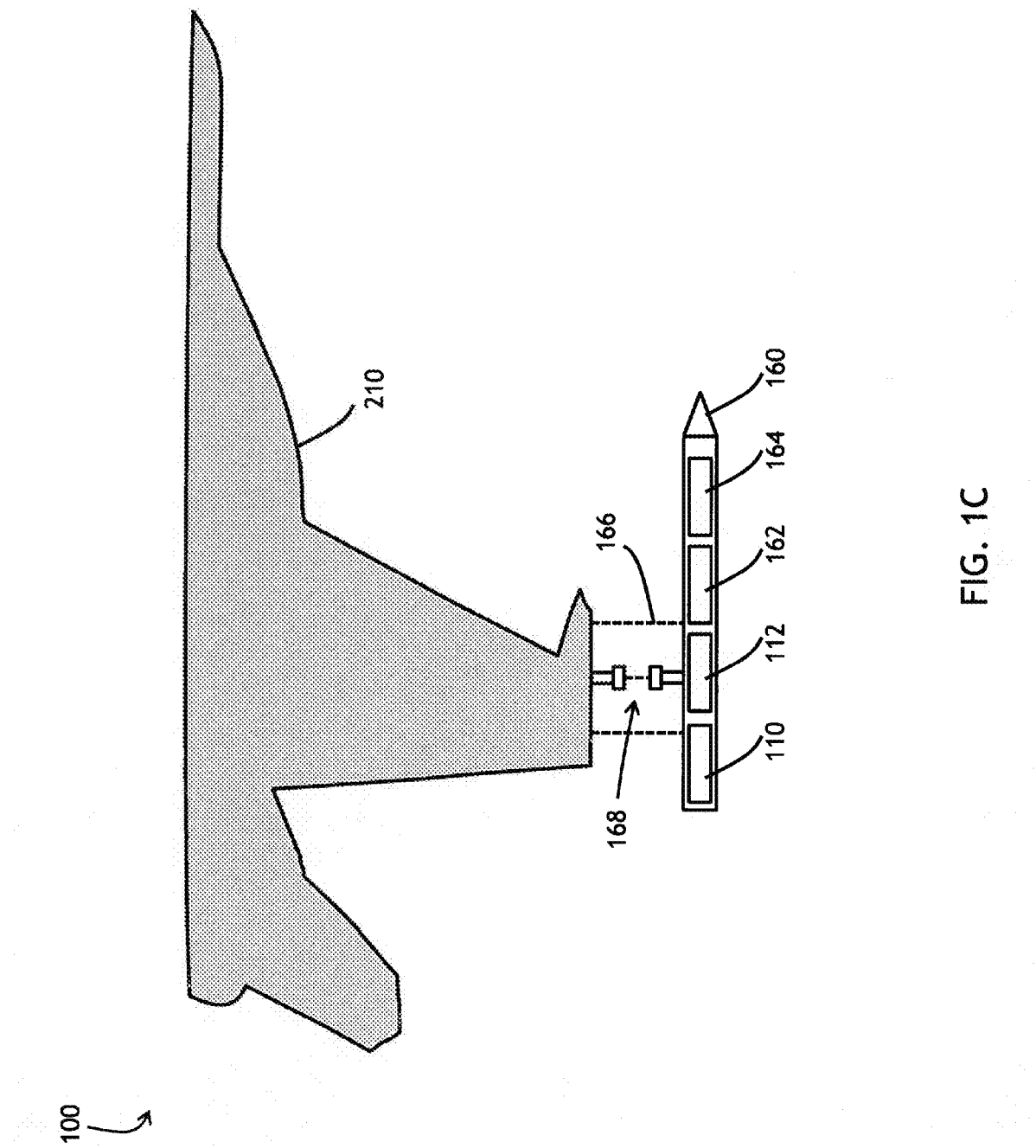
FIG. 1C is a diagram of embedded simulator hardware allocation in accordance with a preferred embodiment of the present invention.

Referring to FIG. 1C, a diagram of embedded simulator hardware allocation in accordance with a preferred embodiment of the present invention is shown. Preferably, deployment of system 100 in a flexible pod 160 configured for ease of removal from the platform 210 to which the pod 160 is mounted may prove beneficial to the training entity. System 100 processing resources may be permanently installed in embedded training form within the pod 160. Migrating some or all of the mission computing 110 functions, LVC interface 112, datalink connectivity 162, and in some cases, Attitude Heading Reference System (AHRS) 164 functions, to a removable embedded training pod 160 may enable a more flexible application of system 100 architecture offering an ability to move the pod to a second platform. Pod 160 mounting connectivity may be accomplished through connection points 166 while data connectivity may be through data connection 168.

Additionally, it is contemplated system 100 may provide training for multiple platforms in a variety of roles. These various roles may require specialized hardware to accurately simulate systems used only in certain training curriculums. For example, a training entity may possess an older fighter aircraft having antiquated avionics. Such older fighter aircraft may be nearly useless to the training entity tasked with training pilots in the most advanced weapons systems and capabilities. The training entity may equip the older fighter with inexpensive MFDs 150 170 and a Pod 160 allowing for valuable pilot training in advanced avionics while flying the older fighter aircraft. In this case, allocation of such specialized hardware into only a limited set of training pods 160 would allow more flexible use of training equipment. System 100 preferred use of a partitioned, standards-based ARINC 661 remote application architecture to integrate the training applications into the OFP may enable this functionality to be allocated to an external pod 160.

Software Architecture

System 100 simulation may preferably be in the form of a simulation kernel that may load and manage execution of a configurable collection of plug-ins, each plug-in termed a Simulation Element (SE). As used herein, plug-in is defined as a software component that may operate in cooperation with, and add specific function to, an existing software application while remaining separate from the existing software application. The configurable collection of plug-ins may enable customization an application's functionality. On the platform 210, each SE may simulate a device or system that may be present on the platform for which training may be being performed. For example, a Fire Control Computer SE maintains information about aircraft weapon kinematics, master mode and sub modes, targeting status and responsibilities, steerpoint data and selection, and the like. A separate Weapons Inventory SE may record simulated stores loadout of the platform 210. Another pair of SEs may perform computations for prelaunch munition cueing and postlaunch simulated munition flyout. The modular nature of these Simulation Elements may allow training entity selection of desired training function from a pool of available, interoperable training components.

The SEs of system 100 may preferably communicate by publishing and subscribing variables on a Virtual Data Network (VDN). The VDN may function as a data store for all training data that would be distributed on physical buses in the actual platform 210 for which training is desired. The VDN also may carry all data concerning Live, Virtual, or Constructive objects that have either been brought in from, or will be published onto, the training datalink. All VDN state variables and distributed simulation data may be available to SEs within the MC/DTU, as well as on the training Ethernet network through the use of a network VDN library.

System 100 may seamlessly integrate a Live object within a simulated training scenario using a virtual simulation of the Live object. One goal of the Live integration includes identifying the Live aircraft state data needed for the simulation. One mechanism system 100 may use to identify the state data may include developing each SE used in the Live aircraft in a second instance of the system 100 operated as a Virtual simulator. In this case, a number of SEs exists to provide a basic flying model of the Live aircraft. For example, a required set of SEs may include: 1) Force and Moments, 2) Equations of Motion, 3) Aerodynamics, and 4) Ground Model SEs to simulate the interactions of the Virtual aircraft with its environment. An additional required set of SEs may include: 5) Hydraulic, 6) Electrical, 7) Engine, and 8) Fuel System SEs simulate the aircraft state. A data dictionary of standard bus values may be populated from these SEs.

When the training function of system 100 may be operational in a Live aircraft, the required SEs may be configured out of the system, and in their place, system 100 may run an AHRS interface SE. A preferred AHRS interface may parse the standard data stream containing sensed state data (e.g., a RS-422 data stream), and publish the same set of variables that the above-mentioned SEs would publish. In this way, both the data dictionary and the training SEs themselves may be identical between the Virtual simulator and the Live aircraft—the only actual difference between the systems may be the SEs used to either simulate or interface with the aircraft state data. In this way, system 100 may minimize the difficulty of maintaining identical behavior between the Live and Virtual training assets.

Training Software Implementation Pattern

System 100 training functions may be implemented in software as a model/view/controller pattern. As an example, fighter aircraft stores management will be detailed.

The preferred Model may include a Weapons Inventory SE. It may load a configuration file at startup that functions to identify the number of stores locations (pylons) on a simulated aircraft and populate those stores locations with a configuration-selected default loadout. For example, in an air-to-air scenario, one configuration may include a combination loadout of radar guided missiles and IR guided missiles, as dependent on the expected threat. Through the duration of the flight, the Weapons Inventory SE may manage changes to the stores inventory. These changes may include the set of selected stores for launch, selected modes and settings of munitions, the removal of launched munitions from wing stores, and tracking of expended stores in an airborne pool until the expected end of their flights. Finally, the Weapons Inventory SE may record and publish each change in a VDN variable.

System 100 may preferably employ a View as a component of an MFD Display SE. The View presented by this SE may collect and display information from a plurality of models. In this Weapons Inventory example, the View of interest may be the Stores Management System (SMS) page. The MFD Display SE may subscribe to the variables published by the Weapons Inventory SE, and use these variables to produce the View presented on the MFD 150 170. In this case, the necessary data may be in the form of a set of runtime parameters of ARINC 661 widgets. The MC/DTU 110 may then send these parameters via ARINC 661 protocol to an ARINC Graphics Server (AGS) process which may run on the MFD 150 170. With these parameters defined, along with a symbology definition file, the AGS has all the information necessary to render the visual presentation of the SMS page.

System 100 may preferably employ a Controller as a component of a Bezel SE. The Bezel SE may operate to interpret MFD 150 170 input from one of the bezel keys surrounding the MFD 150 170. Bezel key presses may be sent from the MFD 150 170 in the return data of the ARINC 661 data stream. However, the MFD 150 170 may properly identify only the number of a bezel key, and not its semantic meaning. The Bezel SE may subscribe to a number of variables, such as the active page on the MFD 150 170, and information about bezel key labels, to translate a key number into a semantically meaningful request. The Bezel SE may then send this request to the Weapons Inventory SE, and complete the control loop.

Although System 100 may clearly define the interfaces between Model, View, and Controller, additional embodiments of the present invention may require installation of alternate components to accomplish desired embedded training. For example, a replacement View implemented as a well-known OpenGL window and a replacement Controller accepting input from a touch panel interface may incorporate an additional user interface. An exemplary additional user interface may allow a very lightweight but low fidelity Virtual simulator to be added to the embedded simulator allowing for a higher participant count.

Finally, it is contemplated System 100 may offer additional functionality for software maintenance purposes. Due to the segregation of processing responsibility in the Model/View/Controller pattern, system 100 may be specially configured for running multiple instances of those functions within a single simulator system for debugging, demonstration, or monitoring purposes. For example, system 100 may configure a Virtual simulator to run the Weapons Inventory, MFD 150 170 Display, and Bezel SEs as would normally be operating in the Live aircraft. This virtualization may provide a display presentation and interaction functionality to the pilot on a physical display installed in the Virtual simulator's main instrument panel. In addition, a repeater display for an instructor station may be added simply by adding the aforementioned OpenGL display and a touch screen controller SE to the configuration. Due to the segregation of functions within system 100, no software configuration overhead may be required to extend the system 100 to provide these duplicate displays.

Supported Functionality

Preferably, system 100 may command a number of SEs to simulate aircraft functions. Exemplary SEs commanded to perform functions of close air support and air to air intercept operations may include:

a. Fire Control Computer (FCC)
b. Weapons Inventory
c. CueingIntf
d. FlyoutIntf
e. MFD
f. RadarIntf
g. HudIgInterface
h. MfdDisplay661

FCC: The Fire Control Computer FCC may be a Model SE that maintains information about steerpoints, targets, master mode and submodes, and sensor of interest of the Flight Deck. Its control inputs may include mode selection and HOTAS control switch inputs.

Weapons Inventory: A Weapons Inventory may be a Model SE that maintains information about remaining stores available for launch, selected munition, and configurations of the specified munitions. For example, air to ground munitions may be launched with a selectable high/low drag setting, varying number of munitions dropped in a ripple/salvo configuration, etc. By contrast, air to air munitions record caged/uncaged status, slave or boresight mode of launch, etc. In addition, the Weapons Inventory provides very generic weapon flyout and clueing models for situations when a more specific flyout SE may be not available or desired.

CueingIntf: A Cueing Interface may be a Model SE configured to interface with a plurality of third party modeling software capabilities. One example of such third party modeling software may include a library code provided by FAAC Incorporated, 1229 Oak Valley Dr., Ann Arbor, Mich. The Modeling SE may accept the results from the third party modeling software and output a result configured for proper display of prelaunch cueing as in actual operations. However, Modeling SE may be further tailored to de-classify actual weapons capabilities and display generic weapons cueing for an unclassified training scenario.

FlyoutIntf: A Flyout Interface may include a Model SE that provides a real time simulation of post-launch munition flyouts. This SE may receive distributed simulation entity data from the VDN, which as discussed above, may be consistent with the larger distributed simulation exercise. The SE then may provide that data to the flyout model in order to allow simulation of munition active guidance based on post-launch target maneuvering. Post-launch datalink support messages may also be simulated, if applicable. As above, the Flyout Interface may be an addition to a third party library accessible from a fielded non-drop range scoring system. Such a non-drop range scoring system may include an ability to measure a result of the firing of an air-to-air missile based on a plurality of factors such as: geometry present at launch, post launch maneuver of both shooter and target, and end game kinematic energy of the fired weapon. Also, the Flyout Interface may declassify high fidelity classified models to ensure proper information assurance. The output of the Flyout Interface Model SE may include the position and behavior of the simulated munition during its flyout. This data may be pushed into the VDN entity datastore, and may also be distributed via datalink. Distribution may enhance training scenario presentations. Further, it is contemplated a situational awareness display such as a Plan View Display map at an instructor or Range Control Officer (RCO) station may offer a visual presentation of the flight of the munition, and targets may, if applicable to the mission scenario, respond with appropriate countering behaviors during munition Time of Flight (TOF).

MFD: A MFD SE may include a Model SE that maintains information about the internal state of the MFD 150 170, such as page selection, configurable display settings such as overlay layers or optional data blocks. System 100 may run two instances of this SE, and model the internal state of the left and right MFD 150 170*s*. Control inputs for this SE may come from the operator selection of the Bezel SE keys.

RadarIntf: A Radar Interface may include a Model SE simulating the function of an air-to-air fire control radar or ground mapping radar. One example of such a radar simulation may include the radar simulation portion of a Virtual Mission Training System. The Radar Interface SE may collect entity data from the VDN and pass this data to a set of radar simulation processes also running on the Mission Computer 110, which may simulate the navigation, ground mapping, and air to air fire control capabilities of a representative fielded fighter radar. The output of those processes may be a set processed of radar returns. These returns may be then published by the SE, and may be used by the HudIgInterface (below) and MFDDisplay (below) to present targeting and situation awareness data to the pilot. Control inputs to this SE may include HOTAS control inputs 120 and bezel key presses from the MFD 150 170*s*.

HudIgInterface: A Head Up Display (HUD) Image Generator Interface may include a View SE that may collect aircraft, target, and other state data and generate a Common Image Generator Interface (CIGI) data stream which may wrap an Image Generator (IG) specific symbology packet format. These packets may be then packaged and delivered to the IG, providing the information necessary to render the HUD display in a Virtual simulator, or the HUD repeater display in the Live aircraft simulator.

MFD Display661: An MFD Display 661 SE may include a View SE that functions to collect information from a wide variety of Model SEs and generate an ARINC 661 data stream driving the AGS in the physical MFD 150 170. Due to the tight coupling of display and control data required by the ARINC 661 protocol the MFD Display 661 SE may also incorporate the behaviors of a Controller SE. This behavior incorporation may include processing bezel presses and generating control commands which may be shared with other SEs. MFD Display 661 SE may also generate a stores page allowing display and selection of loaded munitions and provide a Horizontal Situation Indicator (HSI) format, which may include a presentation of waypoints and navigational aids recorded in an airborne simulation navigation database. Additionally, MFD Display 661 SE may provide track files of friendly (blue) force positions and sensed enemy (red) force positions on the HSI map as well as a providing a radar display format, which presents a simulated fire control radar scope. Finally, MFD Display 661 SE may generate a training system status format, displaying real time information about the aircraft AHRS health, datalink connectivity, and additional health monitoring information.

Distributed Simulation and the Datalink

System 100 may be configured to operate within a single platform 210 as well as within a combined multi-platform operation connected via datalink. In the Live aircraft, a separate Ethernet interface 184 may be dedicated to the datalink. This dedication may allow segregation of data flows within the flight deck from data flows intended for link wide distribution. The primary data flow over the datalink may include information about the state of entities, munitions, and interactions in the distributed exercise, and the platform's mission computer 110 may be configured to communicate externally using well-known Distributed Interactive Simulation (DIS) datagrams or via a High Level Architecture (HLA) Run-Time Infrastructure (RTI).

One goal of system 100 may include connectivity of a Live platform 210 to the distributed exercise in a manner functionally indistinguishable from a traditional Virtual simulator participant. As might be expected, the network infrastructure may be complex and reliant on a combination of several protocols, bridges, and translators. Once system 100 bridges the various protocols and translates the various languages, system 100 provides a single, completely connected, HLA/DIS network seamlessly connecting the various training entities. Each Live participant may be connected to the distributed exercise in a manner functionally indistinguishable from a traditional Virtual simulator participant.

System 100 may connect MC 110 to the distributed simulation via a Bridge SE provided by the simulation environment infrastructure 124. This Bridge SE may include a protocol bridge that may cross-fill between the VDN entity list and the distributed simulation protocol. Depending on the required environment, this SE may also interoperate with DIS or HLA. Three separate SEs may provide connection to these three protocols, but the SEs share a large pool of common source code, differing only in the protocol interface portion.

System 100 may process incoming exercise entity data via the Bridge SE, and create an equivalent persistent entity in the VDN datastore. Upon receipt of subsequent data, system 100 may compare the subsequent data to the existing entity in the VDN, and apply necessary incremental updates. Conversely, system 100 may create an exercise local entity, such as ownship position or locally simulated munitions in flight. System 100 may identify, correlate, and publish these local entities into the distributed simulation exercise via the Bridge SE. Equivalent paths may be in place for Emitters, signals and other distributed entity persistent objects.

Additional Function

System 100 may also operate as a translator for objects unrecognizable by certain entities. For example, an external event such as fire, detonation, collision, and simulation control may not be recognizable by certain entities. System 100 may receive these objects from the distributed entities and convert them to a common format and re-broadcast to various SEs within the exercise via a configurable distribution list. System 100 SEs may also publish a locally generated event, which system 100 may likewise distribute to interested local SEs, and then convert and forward to the datalink 242.

System 100 may embed additional training elements offering additional function within the platform 210. When a simulator may be used as a Virtual participant, the simulator may be directly connected to the larger distributed simulation exercise and may participate as a standard HLA or DIS player. Likewise, in the Live platform 210, the network between the Mission computer 110 and airborne interface side of the datalink 184 may also carry HLA or DIS traffic. Due to the ready access to this standard protocol network within the Live platform 210, it may be possible to easily embed additional training functions, such as embedded Semi-Automated Forces (SAF) or a situational awareness display such as the aforementioned Plan View Display for instructor/safety pilot use, into the Live platform 210 or simulator.

Where the datalink connects to the Live platform's airborne DIS/HLA network 180 182, however, system 100 may enable a protocol translator application that may convert the standard distributed simulation data into a set of over-the-air packets tailored for the specific datalink and waveform selected.

A system 100 protocol translator application may perform a plurality of functions depending on the features and/or constraints of the desired datalink pair. For example, system 100 may implement a first application to pair with a time-sliced datalink with a fixed packet size limit datalink, providing message prioritization, rate limiting, and packet fragmentation and reassembly. By contrast, system 100 may implement a second application to pair with a datalink having no intrinsic provision in its protocol for reliable or near-reliable delivery. This second protocol translator application provides a buffer for storage and retransmission of a designated subset of messages which does demand reliable delivery.

Live Sensor/Simulated Sensor Correlation Function

Figure 2A:
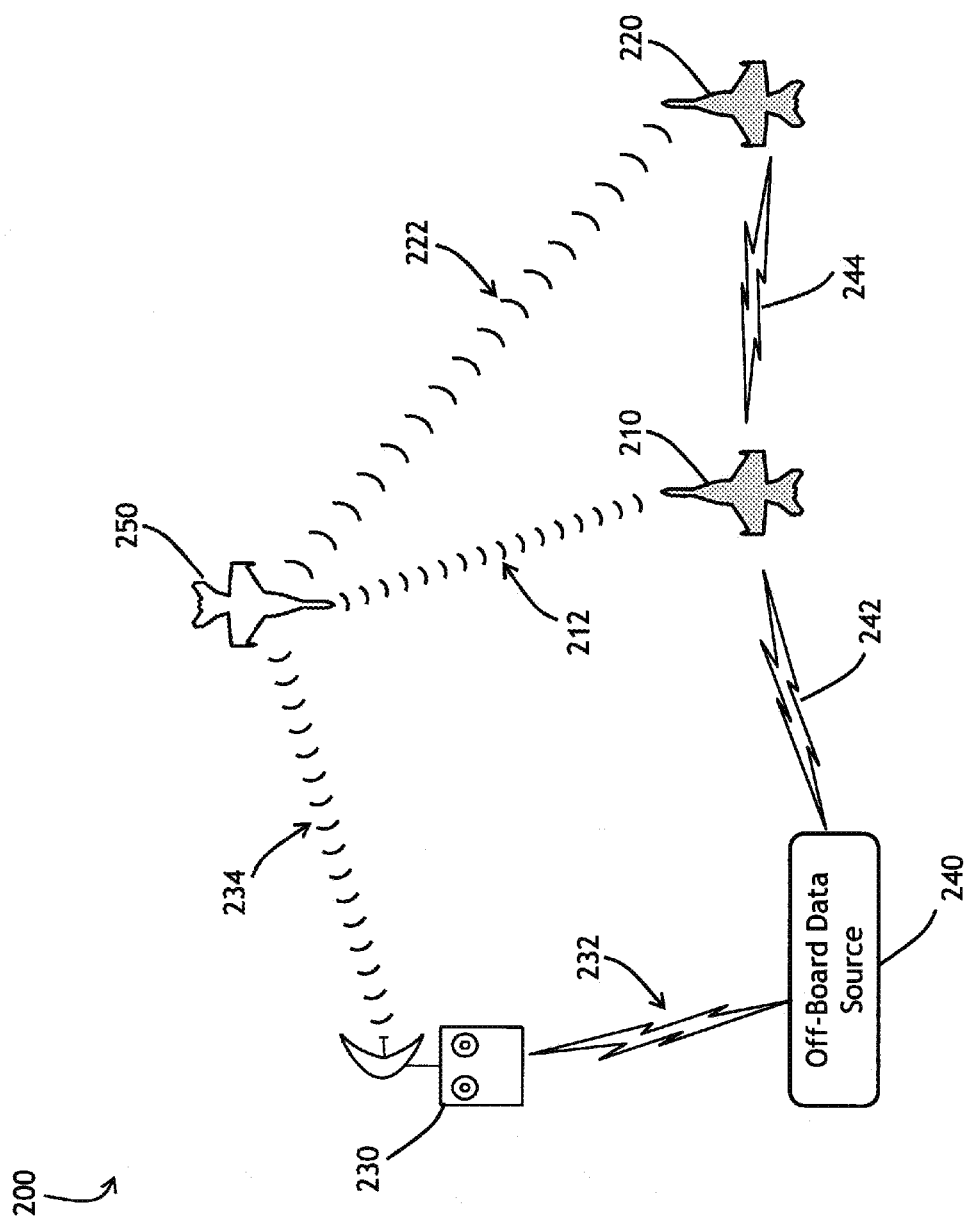
FIG. 2A is a prior art diagram of a correlation function.

Referring to FIG. 2A, a prior art diagram of a correlation function is shown. Traditionally, a platform may correlate sensed data of like kind enabling platform prosecution of a correlated designated target. For example, platform 210 may receive data associated with target 250 via an ownship sensor, (here an RF radar return 212), via data link from an off-board data source 242, and via data link 244 from a Live wing platform 220. These sets of data may all be of similar type since each is sensed data from an RF radar return. Ground based radar 230 may sense the target 250 via ground based radar return 234 transmitted through datalink 232 and 242. Live wing platform 220 may sense the target 250 with onboard radar return 222, and platform 210 may receive sensed data via onboard radar return 112. Platform 210 may then correlate data received from each of the other entities 240 220 to determine validity of the sensed data.

Figure 2B:
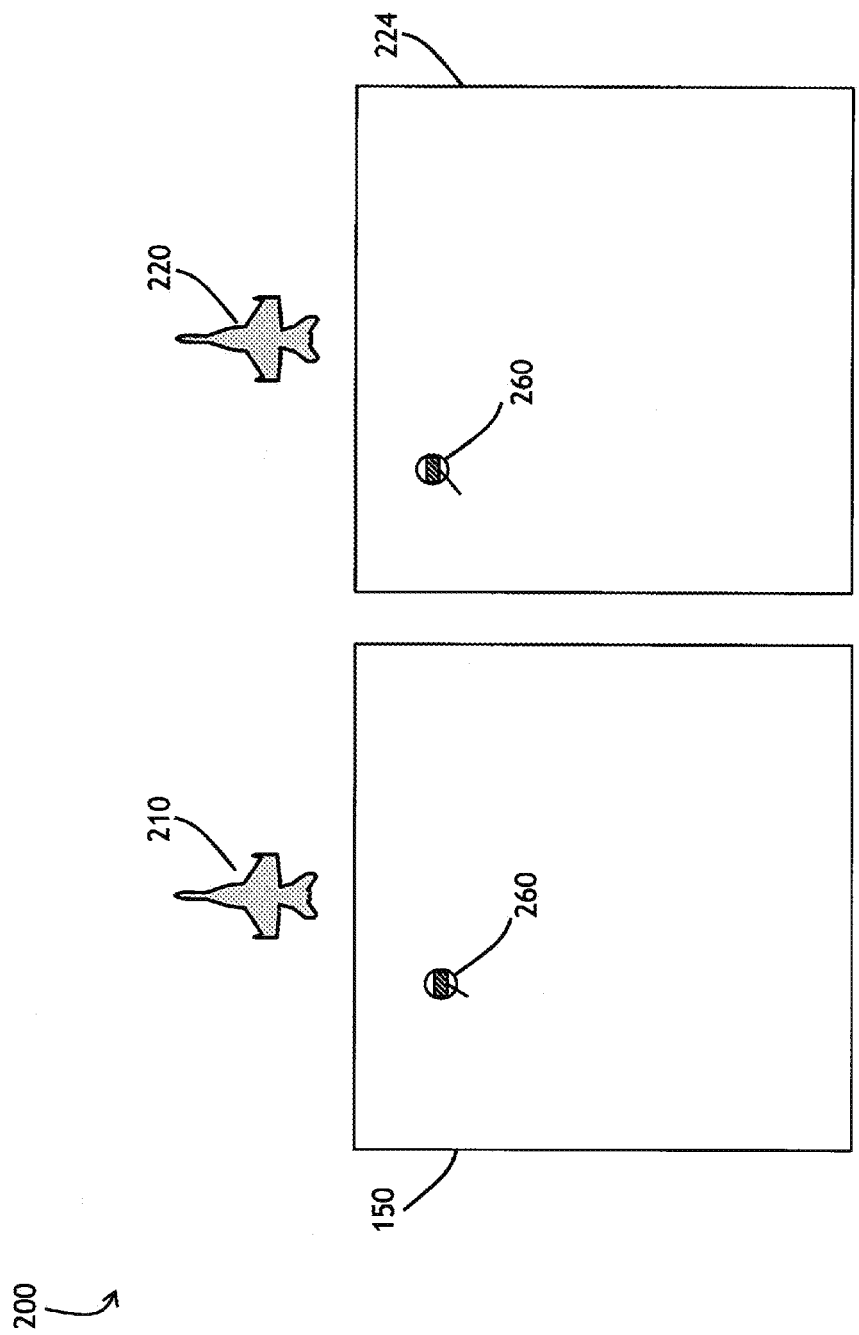
FIG. 2B is a prior art diagram of a displayed correlation function.

Referring to FIG. 2B, a prior art diagram of a displayed correlation function is shown. Each platform 210 220 may display correlated data 260 on a respective MFD 150 224. Should data remain uncorrelated, a possibility of displayed multiple targets exists when a single target may be present.

Track correlation may be a well-defined problem when all targets are Live, for example live objects presenting like data types as received and correlated by the Aegis radar system. However, a training platform participating in an LVC exercise may receive unlike data from multiple sensor streams requiring a more sophisticated method for correlating an object position.

Figure 3:
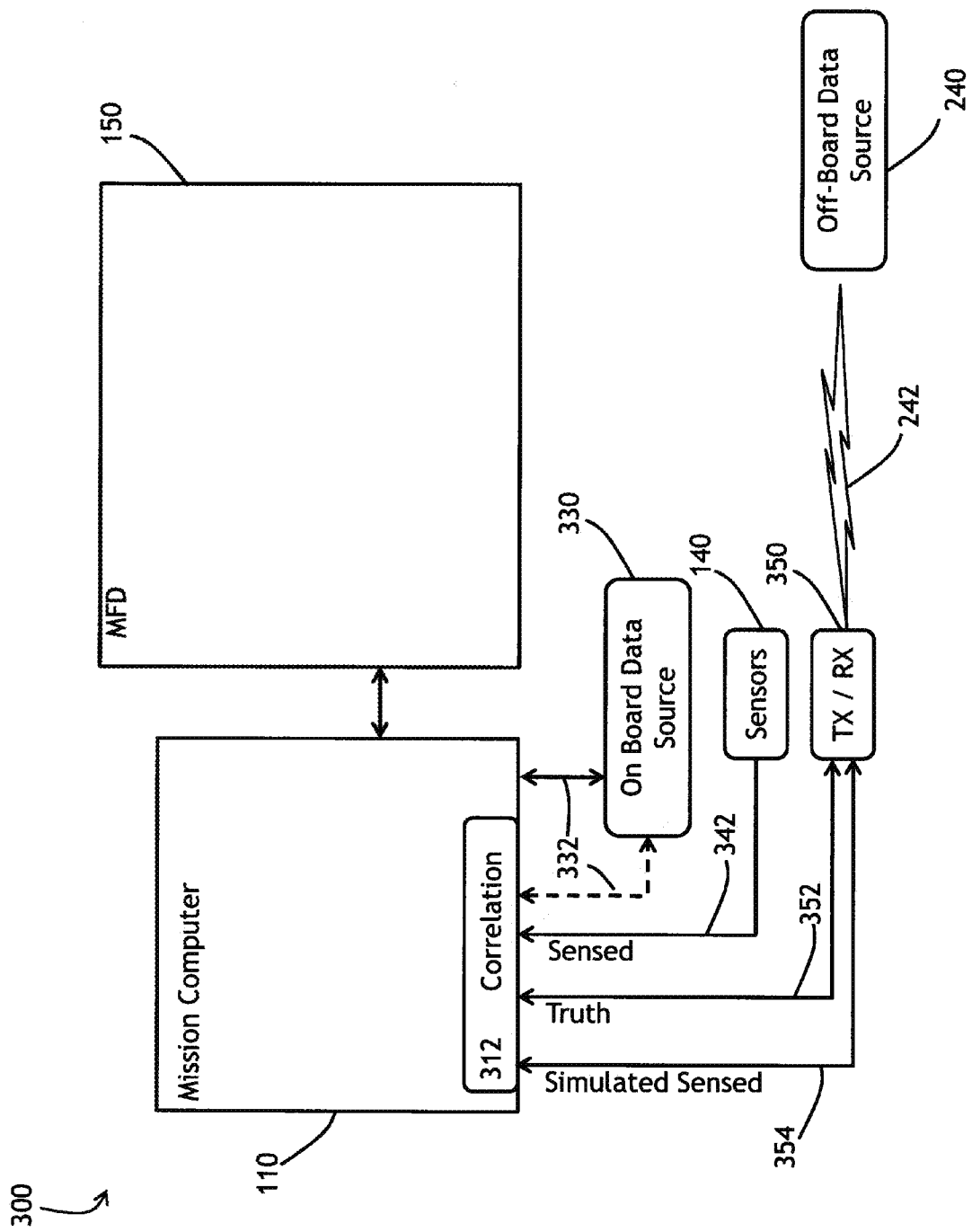
FIG. 3 is a diagram of a correlation function in accordance with a preferred embodiment of the present invention.

Referring to FIG. 3, a diagram of a correlation function in accordance with a preferred embodiment of the present invention is shown. Correlation function 312 may operate as a portion of computing function of MC 110 receiving unlike inputs including simulated sensed data 354, truth data 352, and sensed data 342 operating to correlate the unlike data to determine if a single object position may be present.

Simulated sensed data 354 and truth data 352 may be generated from an off-board data source 240 and received via datalink 242 through onboard transmitter receiver 350. Alternatively, simulated sensed data may be generated by onboard data source 330 transmitted to correlation function 312 through an onboard network 332.

Figure 4A:
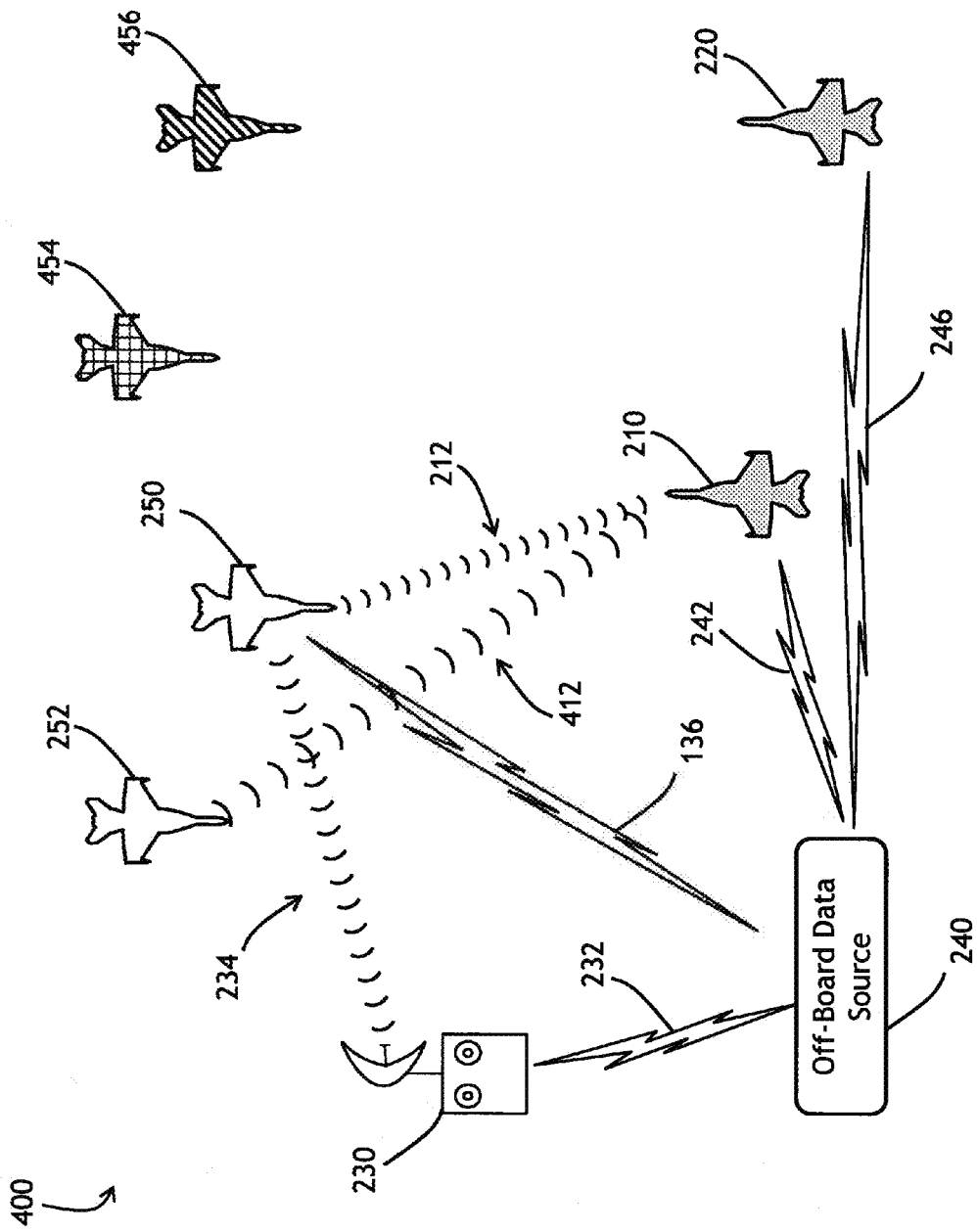
FIG. 4A is a diagram of a configuration of objects representative of a preferred embodiment of the present invention.

Referring to FIG. 4A, a diagram of a configuration of objects representative of a preferred embodiment of the present invention is shown. Platform 210 may receive a plurality of unlike data from the multiple sensor streams. For example, a Live platform 210 may sense another nearby Live target 250 with returns from a physical radar 212, while a nearby Virtual target 454 may be sensed by a radar simulation software 126 embedded in the training aircraft's avionics system. In some cases, multiple sensors (live sensor and simulated sensor) may both see and independently report the same object, though with slightly different data associated with the object (e.g., different sensed positions due to sensor error or intentional noise). Without correlation function 312, this unlike data input may result in duplication of returns on an operator displays and ultimate degradation in situational awareness. A correlation function 312 may determine whether two similar tracks reported from two dissimilar systems may actually be two separate objects or one. Should correlation function 312 determine the two inputs are a single object, it then may determine a single correlated set of data to be displayed.

Preferably, correlation function may interpret data from the three sources (simulated sensed data 354, truth data 352, and sensed data 342), and correlate the three sources indicating only one object where a single object is intended by a simulation entity. For example, in a LVC exercise, Live platform 210 may encounter Live target 250, Live target wingman 252, Virtual target 454, and Constructive target 456. Live platform 210 correlation function 312 may receive sensed data 342 from onboard sensor 140, simulated sensed data 354 from the off-board data source 240 via datalink 242, and truth data from Live target 250 via datalink 136 and 242. Each of the blue fighters 210 220 may receive data associated with the four targets in accordance with the following table:

|  | Target | | | |
| --- | --- | --- | --- | --- |
|  | Live target 250 | Live target wing 252 | Virtual target 454 | Constructive target 456 |
|  | | Data source | | |
| Live platform 210 | Onboard Radar Simulated sensed data Truth data | Onboard Radar | Simulated sensed data | Simulated sensed data |
| Live wing platform 220 | Simulated sensed data Truth data | No received data | Simulated sensed data | Simulated sensed data |

Truth data 352 may be defined as the highest available quality position of an object as generated by the object. Each of the objects in the scenario able to generate and share truth data 352 may do so to enhance the scenario quality. For example, Live target 250 may generate own position using a GPS receiver. The truth data 352 generated and broadcast by Live target 250 via datalink 136 may include the highly accurate GPS position.

Simulated sensed data 354 may be defined as data generated by a computer providing a Virtual object, a Constructive object, and a live object position generated form truth data. Truth data may be altered slightly with noise to more accurately simulate actual sensed data. For example, an actual pilot operating a linked simulator device may become immersed in a LVC exercise. The simulated sensed data position of the Virtual object 454 is commanded by the simulator pilot, yet generated by a computer, then broadcast via datalink. Additionally, a Constructive object 456 may become immersed within a LVC exercise. In the case of a Constructive object, simulated sensed data may be commanded and generated by the computer then broadcast vie the datalink. Additionally, truth data may be generated by Live target 250, broadcast via datalink 136 and 246, received by wing 220 LVC interface, altered slightly to more accurately simulate actual sensed data, and displayed on an MFD 150 170 to operator onboard Live wing platform 220 as simulated sensed data. Further, simulated sensed data may be generated onboard by an onboard data source 330 or generated off-board and received via datalink.

Sensed data 342 may be defined as traditional data as sensed by on onboard sensor 140. For example, an onboard radar may transmit RF energy and compute a position based on the Doppler return of the RF signal.

Figure 4B:
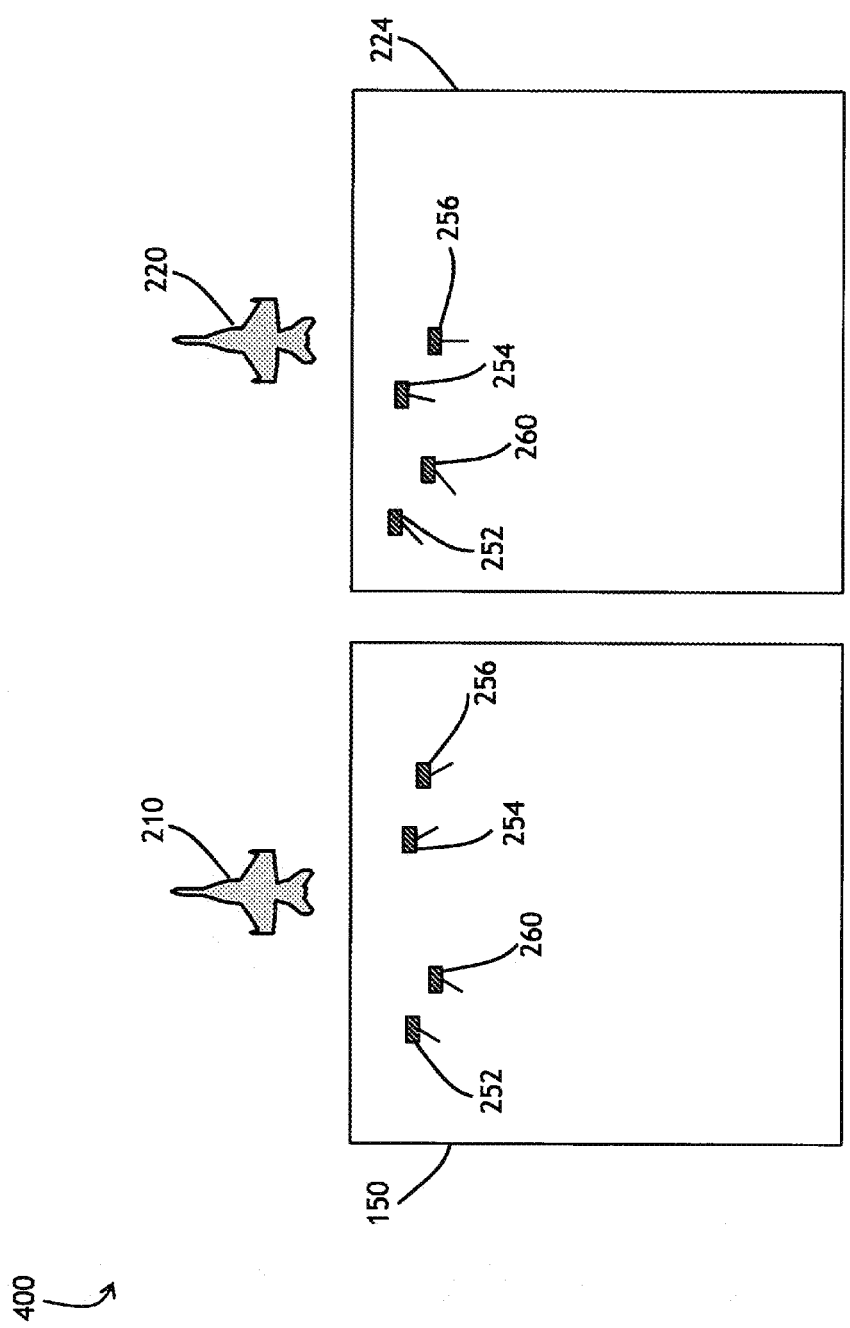
FIG. 4B is a diagram of a display of the configuration of objects of FIG. 4A representative of a preferred embodiment of the present invention.

Referring to FIG. 4B, a diagram of a display of the configuration of objects of FIG. 4A representative of a preferred embodiment of the present invention is shown. MFD 150 of platform 210 and MFD 224 of wing platform 220 may display correlated targets 260 representative of Live target 250 and uncorrelated targets representative of Live target wing 252, Virtual target 254, and Constructive target 256.

Figure 5A:
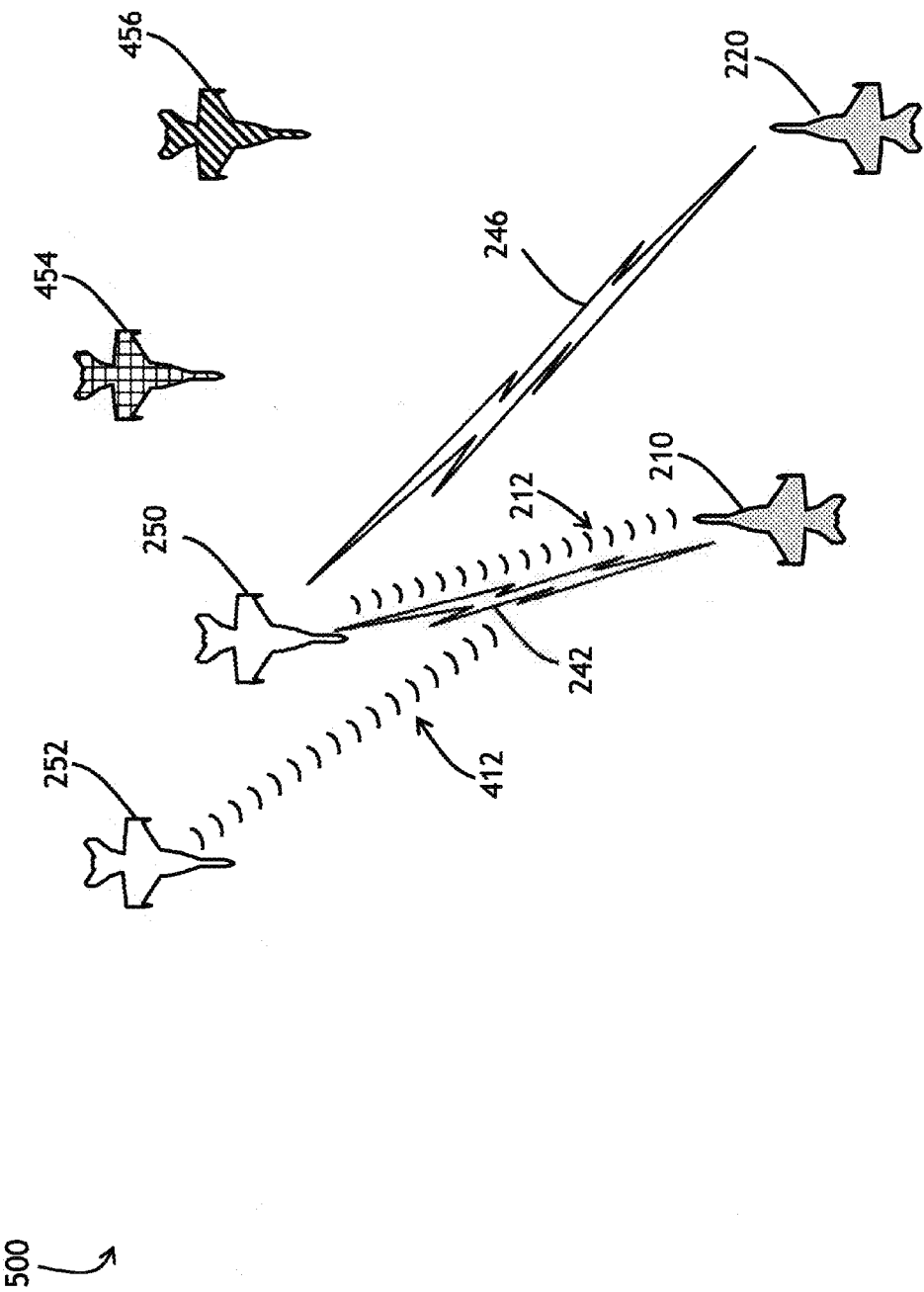
FIG. 5A is a diagram of a configuration of objects representative of an embodiment of the present invention.

Referring to FIG. 5A, a diagram of a configuration of objects representative of an embodiment of the present invention is shown. In this embodiment platform 210 may receive simulated sensed data 354 and truth data 352 from Live target 250 via datalink 242. Sensed data 342 may be provided by an onboard sensor 140. For live platform 210, correlation function 312 may receive the three inputs and provide a correlated display from the data received.

Conversely, Live wing platform 220 may have in inoperable sensor or no onboard sensor installed. Thus, the training scenario for wing platform 220 may be provided completely via the datalink 246. For wing platform 220 onboard correlation function may correlate onboard generated simulated sensed data 354 with received (via datalink 246) truth data 352 to provide a correlated display.

Figure 5B:
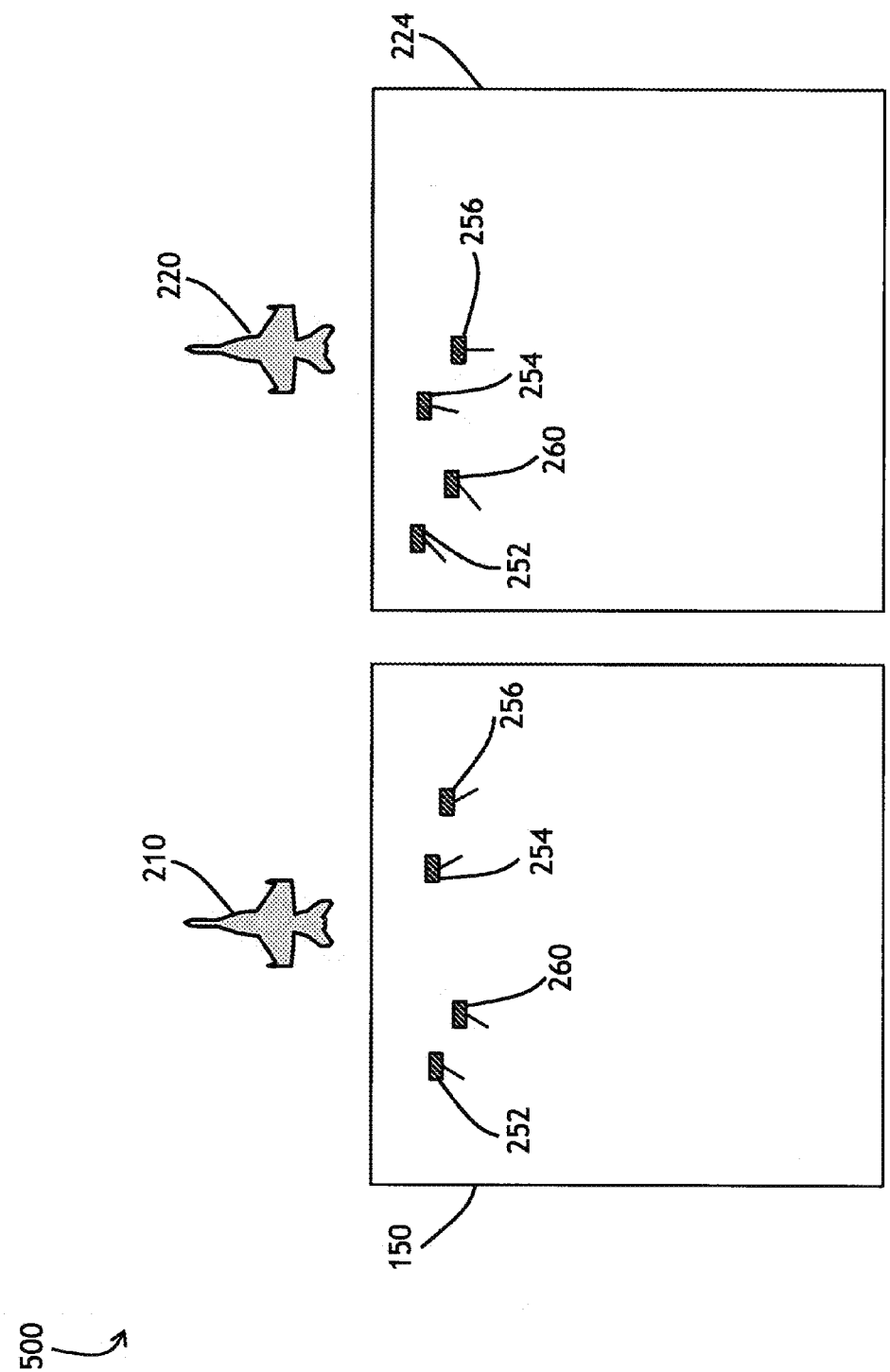
FIG. 5B is a diagram of a display of the configuration of objects of FIG. 5A representative of an embodiment of the present invention.

Referring to FIG. 5B, a diagram of a display of the configuration of objects of FIG. 5A representative of an embodiment of the present invention is shown. Each of the blue fighter platforms 210 220 may display each of the red targets (252, 260, 254, 256) in a seamless, correlated display 150 224. Target 260 may display as a single correlated target on MFD 150 onboard platform 210 even though there may have been three sources (sensed, simulated sensed, and truth) of data received for target 260.

MFD 150 of platform 210 and MFD 224 of wing platform 220 may display correlated targets 260 representative of Live target 250 and uncorrelated targets representative of Live target wing 252, Virtual target 254, and Constructive target 256.

Figure 6:
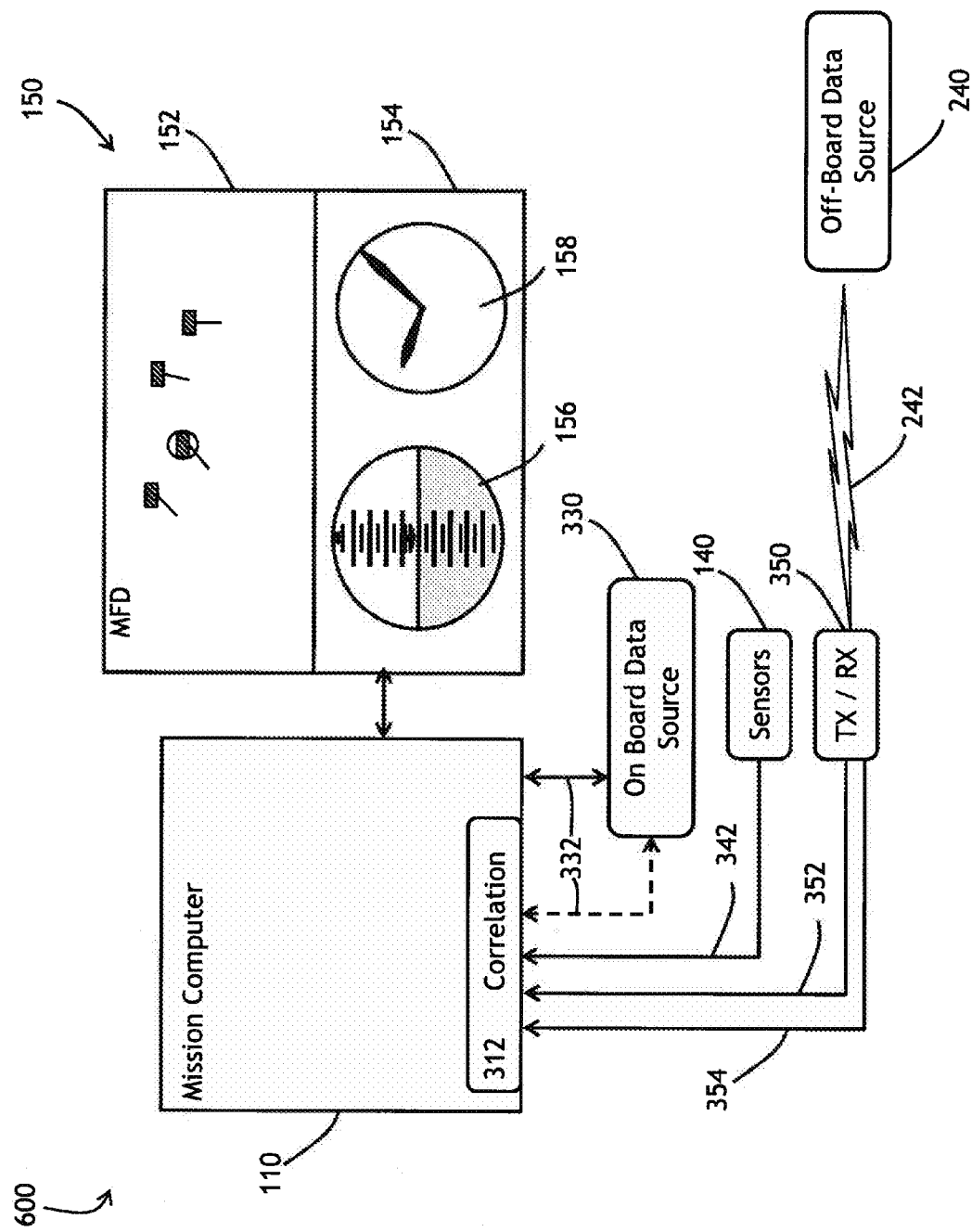
FIG. 6 is a diagram of a partitioned display in accordance with a preferred embodiment of the present invention.

Referring to FIG. 6, a diagram of a partitioned display in accordance with a preferred embodiment of the present invention is shown. To further the goal of safe operation during presentation of training data, MFD 150 may be partitioned to ensure display of a set of critical baseline parameters.

When the training system applications may be active in the Training Mode, an operator may select the training format. When the training format may be active, a first portion 154 of each MFD 150 display area may be reserved for a compressed version of the standby format while the remainder 152 of the display may be available for presentation of training formats. It is contemplated first portion 154 and remainder 152 of the display may be of equal or unequal proportions dependent on an amount of critical information desired. Exemplary critical data may include standby attitude indicator 156 and a standby altimeter 158. As the training format symbology may be generated by software with a lower level of criticality, partitioning within the rendering subsystem may ensure that no training function symbology may be permitted to be rendered within the first portion 154 reserved for the critical baseline set of parameters in the compressed standby format.

In addition, to prevent a hazardous or misleading presentation to the operator, system 100 may impose several restrictions on the training function applications. No functions that present attitude data to the pilot may be permitted to be implemented within the training format processing chain. For example, speed, altitude and position data may be permitted in the context of a training function, such as a target closure speed, or ownship position relative to a common referenced position (e.g., bullseye) on simulated radar. System 100 may prevent presentation of data visually similar to a primary instrument data.

Figure 7:
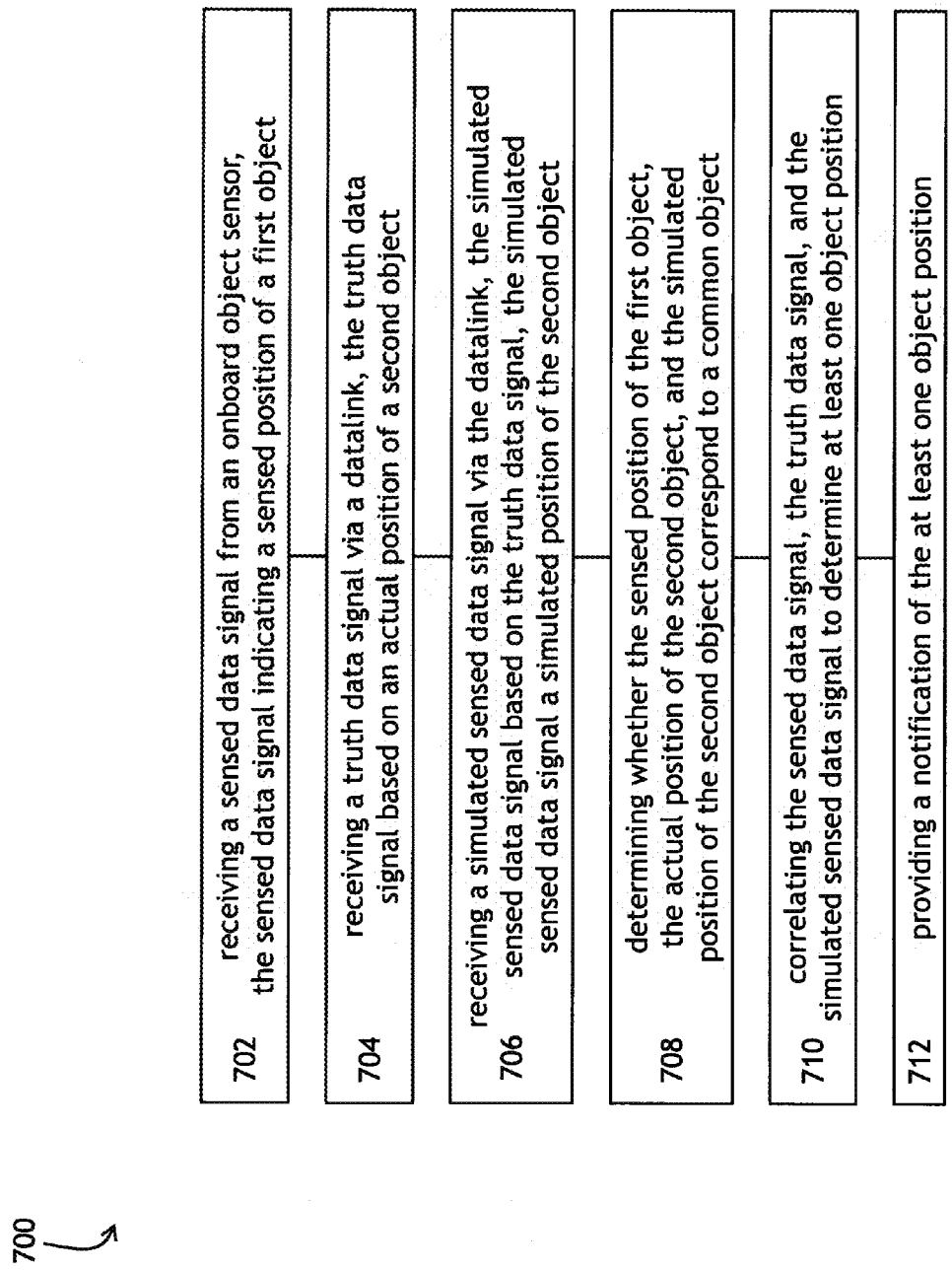
FIG. 7 is a flowchart of a method for correlating an object position in accordance with a preferred embodiment of the present invention.

Referring to FIG. 7, a flowchart of a method for correlating an object position in accordance with a preferred embodiment of the present invention is shown. Method 700 may begin at step 702 with receiving a sensed data signal from an onboard object sensor, the sensed data signal indicating a sensed position of a first object, at step 704, the method may receive a truth data signal via a datalink, the truth data signal based on an actual position of a second object. Method 700 continues at step 706 with receiving a simulated sensed data signal via the datalink, the simulated sensed data signal based on the truth data signal, the simulated sensed data signal a simulated position of the second object, and at step 708, the method determines whether the sensed position of the first object, the actual position of the second object, and the simulated position of the second object correspond to a common object. At step 710 the method 700 correlates the sensed data signal, the truth data signal, and the simulated sensed data signal to determine at least one object position, and finally at step 712, the method 700 provides a notification of the at least one object position.

Figure 8:
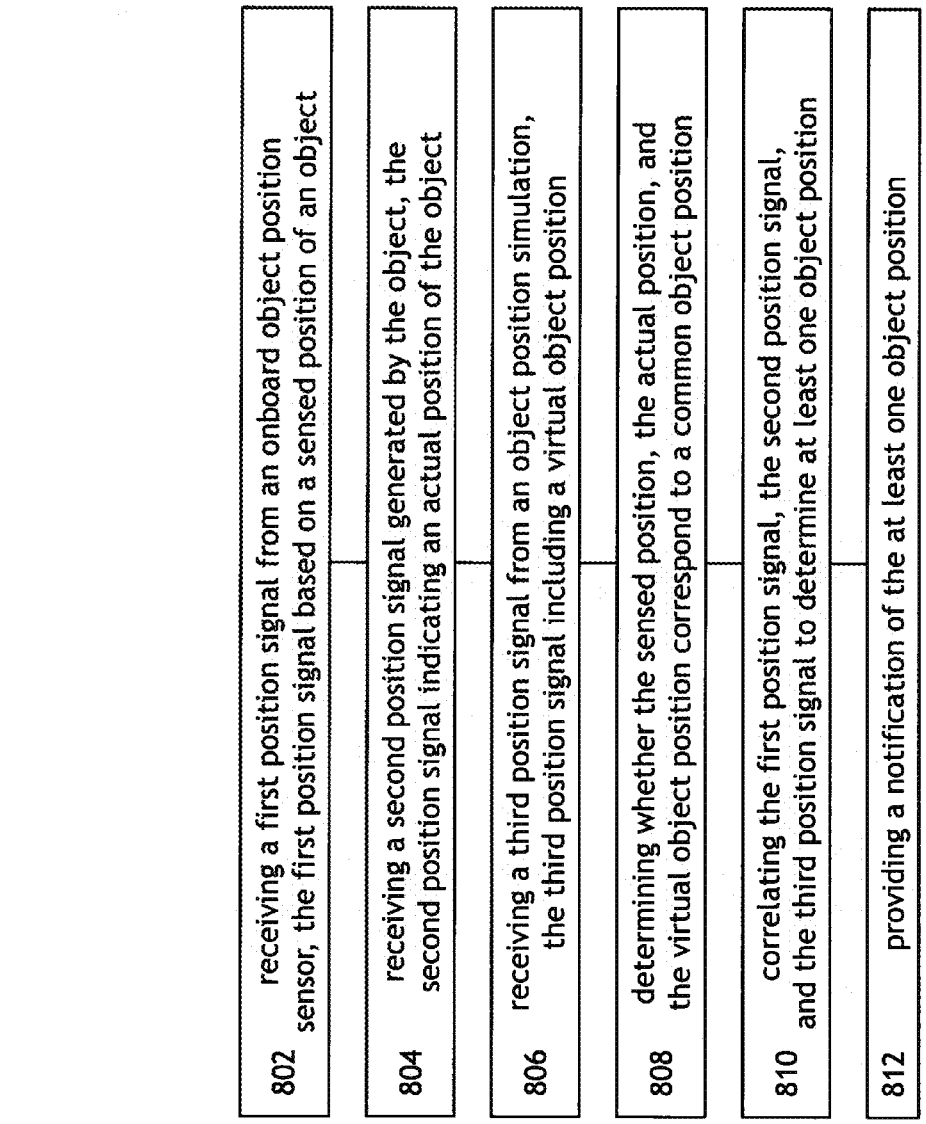
FIG. 8 is a flowchart of a method for correlating an object position in accordance with a preferred embodiment of the present invention.

Referring to FIG. 8, a flowchart of a method for correlating an object position in accordance with a preferred embodiment of the present invention is shown. Method 800 may begin at step 802 with receiving a first position signal from an onboard object position sensor, the first signal based on a sensed position of an object, and, at step 804, receiving a second position signal generated by the object, the second signal indicating an actual position of the object. Method 800 may continue at step 806 with receiving a third position signal from an object position simulation, the third signal including a virtual object position, and at step 808, determining whether the sensed position, the actual position, and the virtual object position correspond to a common object position, at step 810, method 800 correlates the first position signal, the second position signal, and the third position signal to determine at least one object position, and, at step 812, provides a notification of the at least one object position.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for correlating an object position, comprising:
receiving a sensed data signal from an onboard object sensor, said sensed data signal indicating a sensed position of a first object;
receiving a truth data signal via a datalink, said truth data signal based on an actual position of a second object;
receiving a simulated sensed data signal via the datalink, said simulated sensed data signal based on said truth data signal, said simulated sensed data signal a simulated position of said second object;
determining whether said sensed position of said first object, said actual position of said second object, and said simulated position of said second object correspond to a common object;
correlating said sensed data signal, said truth data signal, and said simulated sensed data signal to determine at least one object position; and
providing a notification of said at least one object position.

2. The method of claim 1, wherein said onboard object sensor further comprises at least one of: an onboard radar, an onboard sonar, an onboard Radio Frequency sensor, and an onboard Infrared sensor.

3. The method of claim 1, wherein said sensed data signal, said simulated sensed data signal, and said truth data signal are based on a three-dimensional position of at least one object.

4. The method of claim 1, wherein said truth data signal is further based on a highest available quality position of an object, said highest available quality position generated by said object.

5. The method of claim 1, wherein said simulated sensed data signal further comprises data configured for at least one of: an onboard simulated sensor and an onboard actual sensor.

6. The method of claim 1, wherein said common object further comprises a sphere centered at said actual position of said second object.

7. The method of claim 1, wherein providing a notification of said at least one object position comprises: upon a determination that said sensed position of said first object, said actual position of said second object, and said simulated position of said second object do not correlate to a common object, providing a notification of a position of said first object according to said sensed data signal and a position of said second object according to said simulated sensed data signal.

8. The method of claim 1, wherein providing a notification of said at least one object position comprises upon a determination that said sensed position of said first object, said actual position of said second object, and said simulated position of said second object correlate to a common object, providing a notification of a single object location.

9. A method for correlating an object position comprising:
receiving a first position signal from an onboard object position sensor, said first position signal based on a sensed position of an object;

receiving a second position signal generated by said object, said second position signal indicating an actual position of said object;

receiving a third position signal from an object position simulation, said third position signal including a virtual object position;

determining whether said sensed position, said actual position, and said virtual object position correspond to a common object position;

correlating said first position signal, said second position signal, and said third position signal to determine at least one object position; and providing a notification of said at least one object position.

10. The method of claim 9, wherein said second position signal and said third position signal are received via a datalink.

11. The method of claim 9, wherein said common object position comprises a sphere centered at said actual object position.

12. The method of claim 9, wherein providing a notification of said at least one object position further comprises: upon a determination that said sensed position, said actual position, and said virtual object position do not correlate to a common object position, providing a notification of said sensed position based on said first position signal and a notification of said virtual object position based on said third position signal.

13. The method of claim 9, wherein providing a notification of said at least one object position comprises upon a determination that said sensed position, said actual position, and said virtual object position correlate to a common object position, providing a notification of a single object position.

14. The method of claim 9, wherein providing a notification of said at least one object position further includes a selective presentation of the notification comprising:

receiving off-board data from an external source;

receiving onboard data from an internal source;

determining at least one level of criticality of said off-board data and said onboard data;

presenting said notification of said at least one object position, said onboard data and said off-board data based on said at least one level of criticality.

15. The method of claim 14, wherein said onboard data further comprises data received from at least one of: a speed sensor, an altitude sensor, a heading sensor, an attitude sensor, a depth sensor, a pressure sensor, a location sensor, a simulation environment, a health monitor, a simulation element (SE), a simulated radar, a mission specific memory, and an instructor.

16. The method of claim 14, wherein said off-board data comprises data received from at least one of: a data link, a remote instructor, and a remote range control officer.

17. The method of claim 14, wherein said determining at least one level of criticality of said off-board data and said onboard data further comprises an input from an off-board instructor.

18. The method of claim 14, wherein said presenting said notification of said at least one object position, said onboard data and said off-board data based on said at least one level of criticality further comprises a partition between a first level of criticality and a second level of criticality.

19. The method of claim 14, wherein said presenting said notification of said at least one object position, said onboard data and said off-board data based on said at least one level of criticality further comprises an operator selectable presentation based on an environmental status.

20. The method of claim 14, wherein said presenting said notification of said at least one object position, said onboard data and said off-board data based on said at least one level of criticality further comprises an automated presentation based on a status of a vehicle employing said method.

* * * * *